(No Model.)
W. T. REASER.
BALANCED VALVE.
No. 407,304. Patented July 16, 1889.
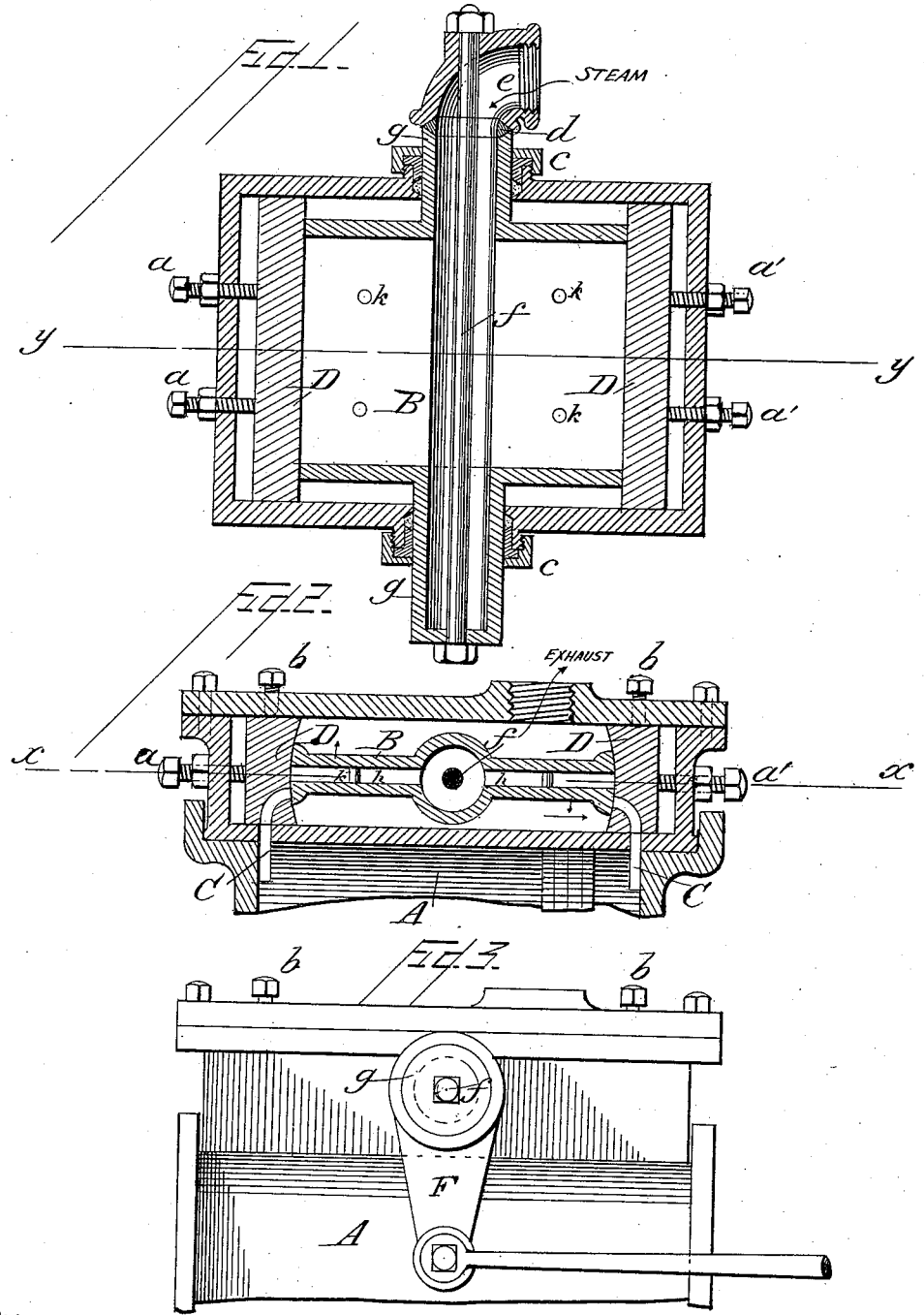
Witnesses
H. H. Schott
W. Burroughs
Inventor,
W. T. Reaser
By W. H. Chandler
Attorney.

UNITED STATES PATENT OFFICE.

WARREN T. REASER, OF FAIRMONT, NEBRASKA, ASSIGNOR TO THE ROUND VALVE COMPANY, OF CHICAGO, ILLINOIS.

BALANCED VALVE.

SPECIFICATION forming part of Letters Patent No. 407,304, dated July 16, 1889.

Application filed August 31, 1888. Serial No. 284,241. (No model.)

*To all whom it may concern:*

Be it known that I, WARREN T. REASER, a citizen of the United States, residing at Fairmont, in the county of Fillmore and State of Nebraska, have invented certain new and useful Improvements in Balanced Valves; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to balanced valves for steam-engines, the object being to provide a perfectly-balanced valve that can be adjusted to allow for expansion and to take up the wear or lost motion while steam is on, and also to cut off the steam close to the end of the cylinder, thus avoiding the excessive clearance and consequent loss of steam in the long passage usual with slide and other similar valve-engines. I provide for this by the mechanism described in the following specification.

Figure 1 is a horizontal section of the steam chest and valve on line $y\ y$ in Fig. 2. Fig. 2 is a vertical longitudinal section on line X X in Fig. 1. Fig. 3 is a side elevation of a steam-chest, illustrating the method of operating the valve. Fig. 4 is a perspective view of one of the port-blocks.

In the drawings, A represents a portion of an ordinary engine-cylinder provided with my improved valve, and A' the steam-chest, preferably cast integral with said cylinder.

B is the valve, which may be made the full length of the cylinder, if required, and is formed with a broad opening or passage $h$ throughout its whole length, and, if necessary, the opposite sides of this opening may be stiffened by connecting-pieces $k$ wherever needed. The ends of the valve are formed to a curvature, the radius of which is equal to the distance from the axis of the valve to its extreme ends, said ends being enlarged to give more bearing-surface.

C is a steam-port through the shell of the cylinder at either end directly under the adjustable port-block D. These port-blocks are adjusted by the set-screws $a$ and $a'$ for the purpose of forcing the blocks D up to the ends of the valve, in order to take up any lost motion that might be occasioned by wear or from any other cause. The inner surfaces of these blocks D have the same curvature as the ends of the valve, so that their surfaces shall be in contact at all times.

$b$ and $b'$ are set-screws, which pass down through the cover E of the steam-chest to hold the blocks down firmly in place after they have been properly adjusted.

$c$ and $c'$ are stuffing-boxes in which the trunnions $g$ of the valve B oscillate.

$d$ is a packing-ring, which forms a steam-tight joint with the elbow $e$, through which steam is admitted to the valve. This elbow is held in contact with the packing-ring $d$ by the bolt $f$ passing through the valve and trunnions.

To operate my improved valve, an arm F may be attached to one or both of the trunnions $g$ and $g'$, or any other suitable device by which it may be oscillated can be used, so as to bring the ends of the valve alternately over and away from the ports in the blocks D.

In the drawings the valve is adjusted so as to take steam through one of the trunnions and exhaust into the steam-chest, but may be so arranged as to take live steam into the steam-chest and exhaust through the trunnions. I prefer, however, to admit live steam through the trunnions and exhaust in the chest, as shown.

It will be observed that the live steam entering the valve through the trunnion exerts an equal pressure in all directions, and that the exhaust-steam filling all the vacant space in the steam-chest presents the same resistance to the movement of the valve in both directions, the whole forming a cheaply-constructed balance-valve perfect in its operation.

Having thus described my invention, what I claim as new, and desire to secure by Letters Patent, is—

1. The adjustable block D, provided with steam-ports, as shown, and adapted for adjustment to the valve and to be secured in place by the set-screws, substantially as shown and described, and for the purpose set forth.

2. In a balanced oscillating valve, the combination of the chambered valve extending nearly the whole length of the cylinder with the adjustable port-blocks provided with passages connecting with the cylinder-ports, substantially as shown and described.

3. As an improvement in balanced oscillating valves for steam-engines, the valve B, chambered throughout its length, the walls of said chamber being connected and stiffened by the studs or connections $k$, and the ends of the valves expanded to form a wearing-surface, in combination with adjustable port-blocks forming the valve-seats, and the means for imparting an oscillatory movement to said valve, substantially as shown and described.

In testimony whereof I affix my signature in presence of two witnesses.

WARREN T. REASER.

Witnesses:
   E. C. DICEY,
   M. J. BURRITT.